United States Patent
Welch et al.

(10) Patent No.: US 8,042,272 B2
(45) Date of Patent: Oct. 25, 2011

(54) METHOD OF ALIGNING A THRUST BEARING

(75) Inventors: Sean M. Welch, Clawson, MI (US); Ronald J. Thompson, Howell, MI (US)

(73) Assignee: Federal-Mogul World Wide Inc., Southfield, MI (US)

(*) Notice: Subject to any disclaimer, the term of this patent is extended or adjusted under 35 U.S.C. 154(b) by 925 days.

(21) Appl. No.: 12/030,384

(22) Filed: Feb. 13, 2008

(65) Prior Publication Data

US 2008/0138004 A1 Jun. 12, 2008

Related U.S. Application Data

(62) Division of application No. 11/141,895, filed on Jun. 1, 2005, now Pat. No. 7,354,199.

(51) Int. Cl.
*B21D 53/10* (2006.01)
*F16C 1/24* (2006.01)
*F16C 9/02* (2006.01)
*F16C 21/00* (2006.01)

(52) U.S. Cl. ............. 29/898.09; 29/898.041; 29/898.07; 384/123; 384/294; 384/368

(58) Field of Classification Search ............. 29/898.041, 29/898.07, 898.09; 384/123, 275, 276, 294, 384/368

See application file for complete search history.

(56) References Cited

U.S. PATENT DOCUMENTS

| | | | |
|---|---|---|---|
| 1,036,270 A | 8/1912 | Kreher | |
| 1,219,978 A | 3/1917 | Masters | |
| 2,028,556 A | 1/1936 | Murdock | |
| 2,821,444 A | 1/1958 | Brown | |
| 4,175,801 A | 11/1979 | Coil et al. | |
| 4,599,147 A | 7/1986 | Thompson | |
| 4,714,356 A | 12/1987 | Damour et al. | |
| RE32,764 E | 10/1988 | Smith et al. | |
| 5,072,707 A | 12/1991 | Takai et al. | |
| 5,192,136 A | 3/1993 | Thompson et al. | |
| 5,363,557 A | 11/1994 | Thompson et al. | |
| 5,433,531 A | 7/1995 | Thompson | |
| 5,435,650 A | 7/1995 | Emig et al. | |
| 5,520,466 A * | 5/1996 | Everitt et al. | 384/294 |
| 6,120,189 A | 9/2000 | Beagle et al. | |
| 6,257,768 B1 | 7/2001 | Martin | |
| 6,511,226 B2 | 1/2003 | Thompson et al. | |
| 6,921,210 B2 | 7/2005 | Welch et al. | |
| 7,101,086 B2 * | 9/2006 | Klier | 384/273 |
| 7,134,793 B2 | 11/2006 | Thompson et al. | |
| 2005/0135716 A1 | 6/2005 | Welch et al. | |

* cited by examiner

*Primary Examiner* — David Bryant
*Assistant Examiner* — Alexander P Taousakis
(74) *Attorney, Agent, or Firm* — Robert L. Stearns; Dickinson Wright, PLLC

(57) ABSTRACT

A thrust bearing assembly includes an upper thrust bearing and a lower thrust bearing for an engine assembly of a vehicle and which, are preferably, identically configured. The thrust bearings each include an arcuate bearing shell with a concave inner surface and a convex outer surface, and each includes a pair of axially spaced flanges extending radially outwardly of the bearing shells. The flanges may be formed as one piece with the bearing shell, and one flange is thicker than the other flange. The thicker flanges are load bearing and preferably contoured, whereas the thinner flanges are not. The bearings are installed with the thick flange of each bearing matched radially opposite the thin flange of the companion bearing to minimize fatigue and failure normally attributed to repeated seating and unseating of bearing assemblies having flanges of equal thickness caused by changing bending loads imparted by a shaft.

9 Claims, 3 Drawing Sheets

METHOD OF ALIGNING A THRUST BEARING

This divisional application claims priority to U.S. patent application Ser. No. 11/141,895, Filed Jun. 1, 2005, now U.S. Pat. No. 7,354,199, and is incorporated herein by reference.

BACKGROUND OF THE INVENTION

1. Field of the Invention

The subject invention relates to a thrust bearing assembly as part of an engine assembly for use in a vehicle and a method of aligning a thrust bearing in the engine assembly.

2. Description of the Related Art

Crankshafts are journaled in engine blocks by a series of axially spaced engine bearings. Each engine bearing includes an upper bearing half seated in an arcuate recess of the block and an accompanying lower bearing half clamped tightly against the upper bearing half by a supportive bearing cap bolted to the engine block. At least one of the engine bearings in the set is designed to absorb axial thrust forces imported by the crankshaft during operation. The so-called thrust bearing differs from the other engine bearing in that it has two axially spaced thrust flanges that project radially outwardly. The thrust bearing presents opposite axially outwardly directed thrust faces which are seated on their backsides against support surfaces of the block and engage associated lobes of the crank shaft, when necessary, to provide the thrust support. These thrust flanges typically have a uniform thickness and often are formed with oil grooves and contours to impart a hydrodynamic oil film action to the bearing.

During operation of the engine, loads on the crank shaft tend to force it in axially opposite directions, accounting for the aforementioned thrust loads imparted to the thrust flanges of the thrust bearing. As the thrust loads are applied in one axial direction, it will be appreciated that the forward-most set of upper and lower thrust flanges will be confronted by the crankshaft lobe and will be seated tightly against the associated support surface of the block. It will be further appreciated that when a thrust force is applied by the crankshaft in the axially opposite direction that the opposite set of thrust flanges will be tightly seated against their associated support surfaces of the block. However, this reverse force also has the effect of unseating the forward-most set of thrust flanges. While the unseated thrust flanges will be re-seated the next time the axial thrust forces imported by the crankshaft change, this constant seating and unseating has the detrimental effect of repeatedly bending and thus stressing the thrust bearing of the base of the thrust flanges, which can lead to premature failure of the thrust bearing. Additionally, the repeated seating and unseating can cause the thrust bearing to become misaligned which can also lead to unwanted stress and failure of the thrust bearings.

It is an object of the present invention to minimize or eliminate undesirable seating and unseating of thrust bearings and thus prolongs the operating life of the thrust bearings.

BRIEF SUMMARY OF THE INVENTION AND ADVANTAGES

The subject invention provides a thrust bearing having an arcuate bearing shell with a concave inner surface and a convex outer surface. The inner and outer surfaces extend arcuately between opposite ends and extend axially between opposite edges. A pair of flanges are formed as one piece with the bearing shell and extend radially outwardly of the bearing shell from the opposite edges thereof. The thickness of one of the flanges is greater than that of the other of the flanges. Such a thrust bearing is used in combination with another such thrust bearing, and orientated such that the thin flange of one bearing is arranged radially opposite the thick flange of the companion bearing in order to control thrust loads and seating and unseating forces on the thrust bearings.

When installed in an engine to journal a crankshaft with thick and thin flanges oppositely arranged, thrust forces exerted by the crankshaft in one axial direction confront the thick flange of one of the bearings causing it to seat firmly in the block. Likewise, thrust forces exerted by the crankshaft in the opposite direction confront the thick flange of the other bearing causing it also to seat firmly in the block. Once seated, it is highly desirable to keep the bearings seated and shield them against any forces, which would cause them to unseat. The present invention provides such protection.

This invention has the advantage of recessing the outer axial faces of the thin flanges axially inwardly of the faces of the thick flanges and by doing so, the crank shaft confronts only the thick flanges is prevented from contacting the thin flanges. As such, this construction and arrangement of the bearings isolates the bearings from any axial "unseating" forces that may otherwise be imparted by the crank shaft to the thin flanges and cause the associated bearings to shift away from this initial fully seated condition. Preventing the condition of repeated seating and unseating further isolates the bearings from bending forces that, over time, could lead to weakening or failure of the bearings.

The invention has the further advantage of enabling companion bearings to be identically constructed for manufacturing simplicity and cost savings.

THE DRAWINGS

These and other advantages of the present invention will be readily appreciated as the same becomes better understood by reference to the following detailed description and accompanying drawings wherein.

DETAILED DESCRIPTION

Figure 1:
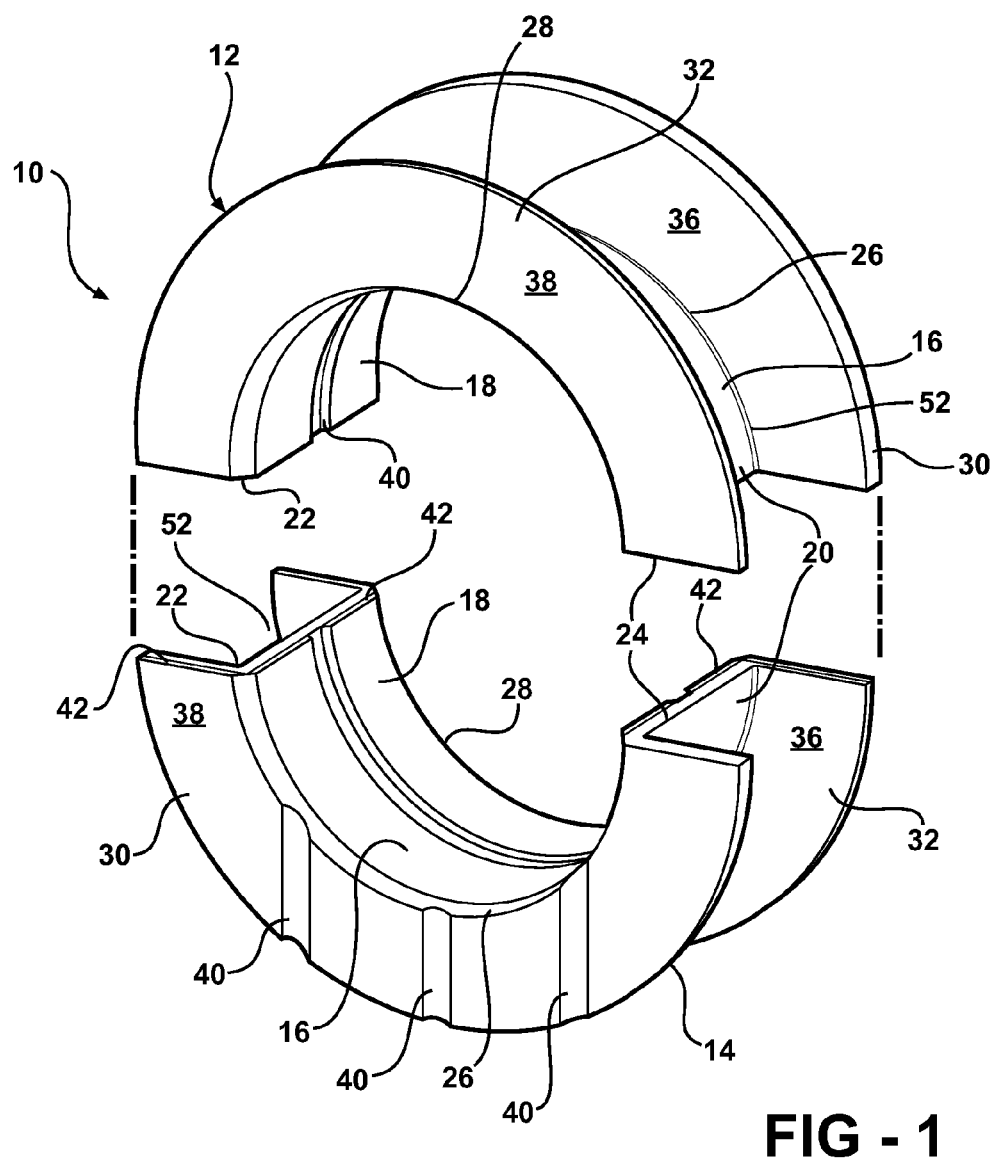
FIG. 1 is a perspective view of a thrust bearing assembly having an upper thrust bearing and a lower thrust bearing.
Figure 2:
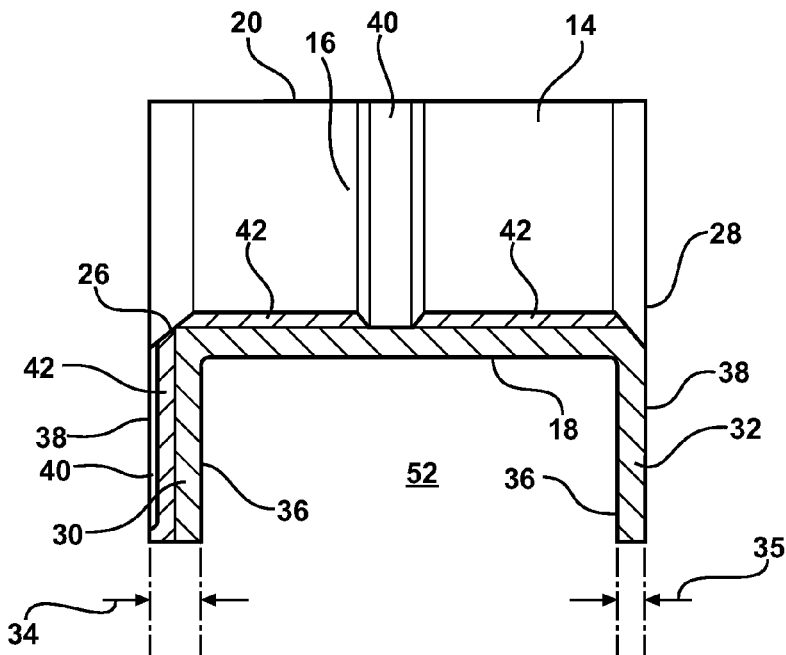
FIG. 2 is a cross-sectional view of either one of the upper thrust bearing and the lower thrust bearing.

A thrust bearing assembly is shown generally at 10 in FIG. 1. The thrust bearing assembly 10 includes an upper thrust bearing 12 and a lower thrust bearing 14. A cross-sectional view of the lower thrust bearing 14 is illustrated in FIG. 2. It is to be appreciated that the upper and lower thrust bearings 12, 14 are substantially identical, as will be described below.

Both of the upper and lower thrust bearings 12, 14 include an arcuate bearing shell 16 with a concave inner surface 18 and a convex outer surface 20. The bearing shell 16 extends between first and second ends 22, 24, as shown in FIG. 1, and extends axially between opposite edges 26, 28.

A pair of flanges, a thick flange 30 and a thin flange 32, extend radially outwardly of the bearing shell 16 from the opposite edges 26, 28 thereof. The flanges 30, 32 are formed as one part, or piece, with the bearing shell 16 from a same material. The material is formed and cut into desired lengths. Then the material is bent to form the flanges 30, 32 and may then be bent in arcs. Alternatively, the flanges 30, 32 may be made separately from the bearing shell 16 and joined mechanically thereto (3-piece construction) as is customary in the art and contemplated by the invention. Each of the upper and the lower thrust bearings 12, 14 has the thick flange 30 and the thin flange 32 extending radially from the outer surface 20. Each of the flanges has an associated axial thickness 34, 35. The thickness 34 of one of the flanges 30 is greater than the thickness 35 that of the other flanges 32.

Figure 3:
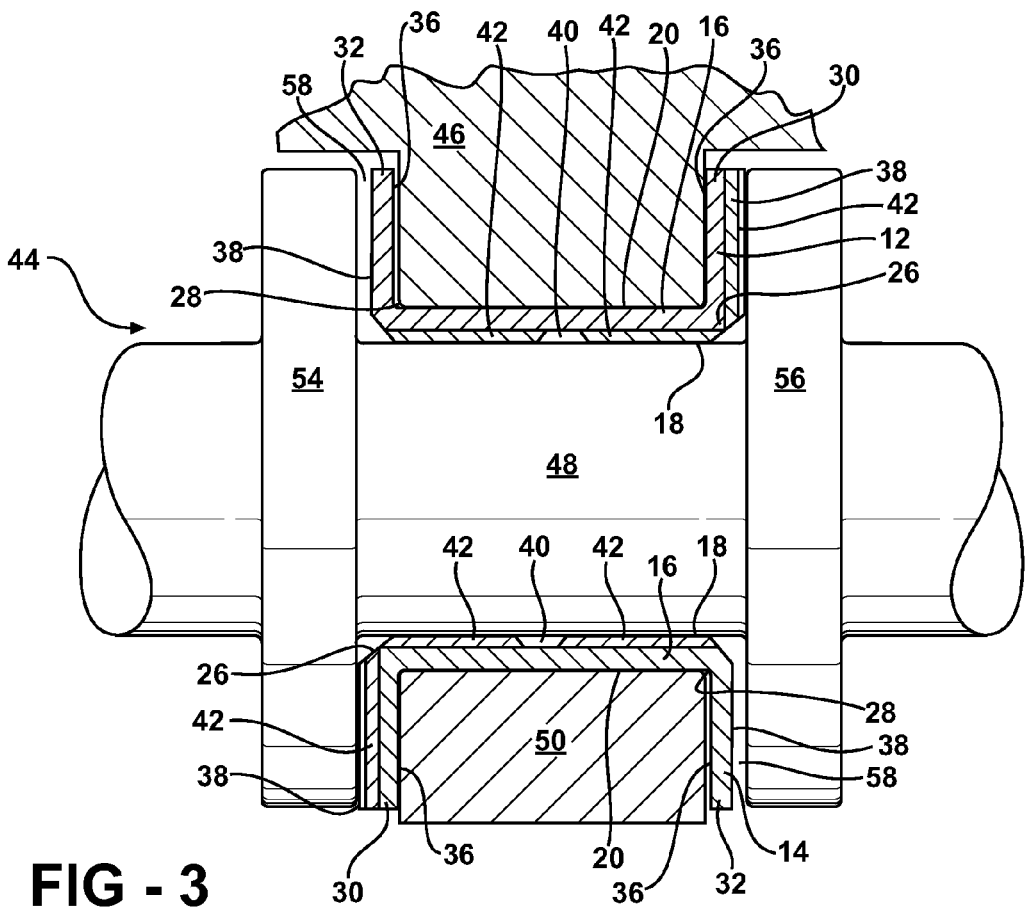
FIG. 3 is a cross-sectional view of the thrust bearing assembly shown mounted into an engine assembly.
Figure 5:
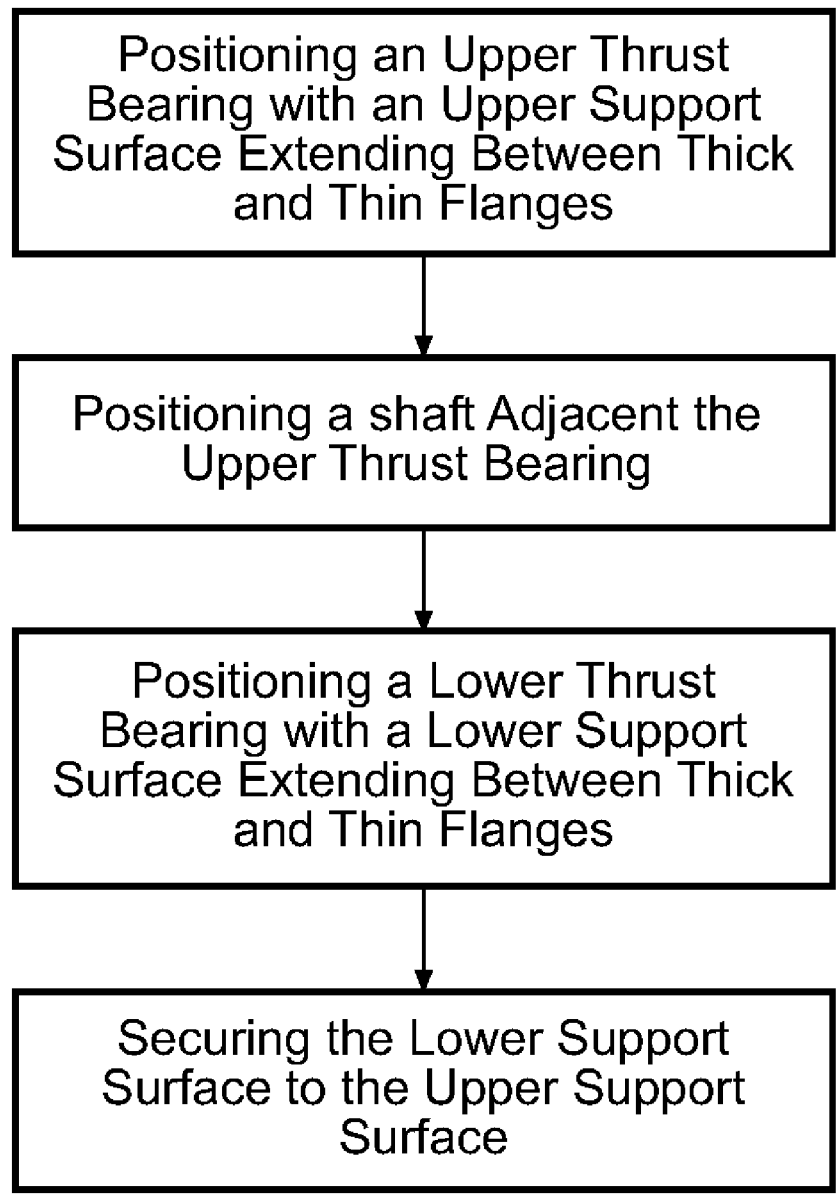
FIG. 5 is a flow chart of an exemplary method of aligning a thrust bearing assembly in an engine assembly of a vehicle.

When the bearings 12, 14 are arranged in the thrust bearing assembly 10, the first and the second ends 22, 24 of the upper and the lower thrust bearing 12, 14 are positioned substantially in mating contact, with the first end 22 of the upper thrust bearing 12 disposed in mating contact with the first end 22 of the lower thrust bearing 14, and the second end 24 of the upper thrust bearing 12 disposed in mating contact with the second end 24 of the lower thrust bearing 14. When so are arranged, the thick flange 30 of the upper thrust bearing 12 is aligned or matched radially opposite the thin flange 32 of the lower thrust bearing 14 as illustrated in FIGS. 1 and 3.

Figure 4:
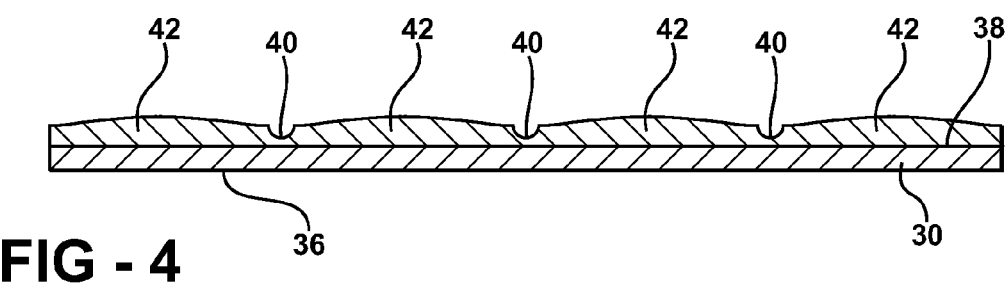
FIG. 4 is a cross-sectional view of one of the outer faces of the thrust bearing having contours.

Each of the thick flanges 30 and the thin flanges 32 has an inner face 36 and an outer face 38. The outer face 38 may be contoured as is known in the art and as shown in FIG. 4. Preferably, the outer face 38 of the thick flange 30 is contoured while the outer face 38 of the thin flange 32 is free of such contours. In addition to being contoured, the outer face 38 preferably is formed with a series of oil grooves 40. The oil grooves 40 channel a lubricant to and from the contoured outer face 38 to develop a protective hydrodynamic oil film across the contoured face 38 during operation to reduce friction and wear. The outer faces 38 of the thin flange 32 may also include similar oil grooves to facilitate lubrication in the event contact does occur.

Aligning the ends 22, 24 as set forth above results in the outer faces 38 of the upper and the lower thrust bearings 12, 14 being offset from one another by the thickness 34 of the thick flange 30. The outer face 38 of the thick flange 30 of the upper thrust bearing 12 is in a different plane that the outer face 38 of the thin flange 32 of the lower thrust bearing 14, as best shown in FIG. 3. Because the outer faces 38 are in different planes, when a force is exerted in one direction on the upper thrust bearing 12, the lower thrust bearing 14 does not become unseated. This result is obtained because the thin flange 32 of the upper thrust bearing 12 is not in contact with adjacent support surfaces to transmit the force. Therefore, once one of the thrust bearings 12, 14 is seated, it will not become unseated due to a force in the opposite direction. Also, the thrust bearings 12, 14 will have less wear and fatigue because they are only subjected to a force in one of the directions. Once the upper and lower thrust bearings 12, 14 are seated properly; the opposite bearing is isolated from the force in the direction to unseat the bearing because of the thin flange 32.

The outer faces 38 of the thick and thin flanges 30, 32 may also include a bearing material 42 disposed thereon. The bearing material 42 may be ramped to form the contours on the outer face 38. The bearing material 42 is relatively softer than the underlying base metal of the bearing shell 16 and flanges 30, 32, which are typically made of steel. Those copper or aluminum-based bearing materials typically used in thrust bearing applications may be used in the present invention. Although the invention contemplates other bearing materials as well including polymer-based material. The bearing material 42 may be added to the material before bending the flanges 30, 32 or after the flanges 30, 32 are bent. Preferably, the bearing material 42 is only present on the outer faces 38 of the thick flanges 30. If the material is present on both outer faces 38, then the bearing material 42 on the thin flange may be machined off to reduce the thickness 35 of the thin flange 32 relative to the thick flange 30.

Referring to FIG. 3, an engine assembly for use in a vehicle (not shown) is shown generally at 44. The engine assembly has the thrust bearing assembly 10 incorporated therein. The upper and lower thrust bearings 12, 14 are preferably identically configured, but arranged opposite from one another in reverse orientation, such that the contoured thick flange 30 of the upper thrust bearing 12 is arranged opposite the thin flange 32 of the lower thrust bearing 14. The thin flange 32 of the upper thrust bearing 12 is arranged opposite the thick flange 30 of the lower thrust bearing 14. The engine assembly 44 includes an upper support surface 46, a shaft 48 received within the upper support surface 46, and a lower support surface 50. The upper support surface 46 is preferably an engine block and the lower support surface 50 is preferably a bearing cap. The shaft 48 is preferably a crankshaft 48.

The thrust bearing assembly 10 rotatably supports the shaft 48 between the upper thrust bearing 12 and the lower thrust bearing 14 when in mating contact, as described above. A gap 52 is defined between the thick and thin flanges 30, 32 of the upper and lower thrust bearings 12, 14, respectively. The gap 52 of the upper thrust bearing 12 receives the upper support surface 46 and the gap 52 of the lower thrust bearing 14 receives the lower support surface 50.

In the preferred embodiment, the shaft 48 is the crankshaft having forward and rearward lobes 54, 56 next adjacent the bearing assembly 10. The terms "forward" and "rearward" are used to denote opposite ends or direction of the crankshaft in relation to the front and back of the engine, which may be arranged front to back in the vehicle, or transverse, as the case may be. The forward lobe 54 is closer to the front of the engine assembly 44 and the rearward lobe 56 is closer to the rear of the engine assembly 44. The thick flange 30 of the upper thrust bearing 12 preferably engages the rearward lobe 56 of the shaft 48 and the thick flange 30 of the lower thrust bearing 14 preferably engages the forward lobe 54 of the shaft 48. Alternately, the bearings 12, 14 may be reversed, such that the thick flange 30 of the upper thrust bearing 12 contacts the forward lobe 54 and the thick flange 30 of the lower thrust bearing 14 contacts the rearward lobe 56.

In the preferred embodiment, the upper and the lower thrust bearings 12, 14 define a clearance 58 between the thin flange 32 and the upper and the lower support surfaces 46, 50, respectively. The clearance 58 is defined when the thick flange 30 abuts the respective upper and lower support surfaces 46, 50 when the upper and the lower support surfaces 46, 50 are positioned in the respective gaps 52. The thick flange 30 has the thickness 34 greater than a sum of the thickness 35 of the thin flange 32 and the clearance 58. The clearance 58 allows for isolation of the upper and lower thrust bearings 12, 14 when force is applied opposite the thick flange 30 of each thrust bearing 12, 14 respectively. The thick flange 30 of the upper thrust bearing 12 is the load bearing surface for a forward force and the thick flange 30 of the lower thrust bearing 14 is the load bearing surface for a rearward force. The thin flanges 32 do not receive the load and are therefore non-load bearing flanges. It is to be appreciated that the thin flanges 32 may even be omitted without deviating from the subject invention. When the forward force is applied to the shaft 48, the lower thrust bearing 14 does not receive that force due to the clearance 58 adjacent the thin flange 32 and therefore the thick flange 30 of the upper thrust bearing 12 receives it. Likewise, when the rearward force is applied to the shaft 48, the upper thrust bearing 12 does not receive that force due to the clearance 58 adjacent the thin flange 32 and therefore the thick flange 30 of the lower thrust bearing 14 receives it. This reduces the amount of wear and fatigue on the thrust bearing assembly 10 and prevents premature failure. This also ensures that the bearing assembly 10 remains properly seated.

In operation, the upper thrust bearing 12 is positioned having the upper support surface 46 extending between the thick and the thin flanges 30, 32. Preferably, the upper thrust bearing 12 is positioned with the thick flange 30 toward a rear of the engine assembly 44 and the thin flange 32 toward a front of the engine assembly 44. After, the upper thrust bearing 12 is positioned, the shaft 48 is positioned adjacent the upper thrust bearing 12. The lower thrust bearing 14 is then positioned having the lower support surface 50 extending between the thick and the thin flanges 30, 32. Preferably, the lower thrust bearing 14 is positioned with the thick flange 30 toward the front of the engine assembly 44 and the thin flange 32 toward the rear of the engine assembly 44. The upper and lower thrust bearings 12, 14 are positioned such that the thick flange 30 of one is matched radially opposite with the thin flange 32 of the other. The lower support surface 50 is secured to the upper support surface 46 to position the lower thrust bearing 14 in mating contact with the upper thrust bearing 12.

Once secured, the thrust bearing assembly 10 rotatably supports the shaft 48. A rearward force is then applied to the shaft 48 toward the rear of the engine assembly 44 to seat the thick flange 30 of the lower thrust bearing 14 against the lower support surface 50. Next, a forward force in the opposite direction is applied to the shaft 48 toward the front of the engine assembly 44 to seat the thick flange 30 of the upper thrust bearing 12 against the upper support surface 46. During operation of the engine, these forward and reward forces are constantly be generated and absorbed by the thrust bearing assembly 10. The thick flanges 30 of the upper and lower thrust bearings 12, 14 carries the load of these forces and the clearance 58 surrounding the thin flanges 32 prevent the upper and lower thrust bearings 12, 14 from becoming unseated. Because the thrust bearing assembly 10 does not become unseated, the bending and fatigue of the bearings 12, 14 is reduced, as described above.

Obviously, many modifications and variations of the present invention are possible in light of the above teachings. The invention may be practiced otherwise than as specifically described within the scope of the appended claims.

What is claimed is:

1. A method of aligning a thrust bearing assembly in an engine assembly of a vehicle, the engine assembly including at least an upper support surface, a shaft received within the upper support surface, and a lower support surface, said method comprising:
    providing the thrust bearing assembly to rotatably support the shaft in the upper support surface, the thrust bearing assembly having an upper thrust bearing and a lower thrust bearing;
    providing the upper thrust bearing and the lower thrust bearing with a concave inner surface and a convex outer surface extending arcuately between opposite ends and extending axially between opposite edges, each of the upper and the lower thrust bearings having a thick flange extending radially from the outer surface thereof from one of the edges and a thin flange extending radially from the outer surface thereof from the other of said edges, the thick flange having a thickness greater than that of the thin flange;
    positioning the upper thrust bearing having the upper support surface extending between the thick and the thin flanges;
    positioning the shaft adjacent the upper thrust bearing;
    positioning the lower thrust bearing having the lower support surface extending between the thick and the thin flanges; and
    securing the lower support surface to the upper support surface to position the lower thrust bearing in mating contact with the upper thrust bearing.

2. A method as set forth in claim 1 wherein the step of positioning the upper thrust bearing is further defined as positioning the upper thrust bearing with the thick flange toward a rear of the engine assembly and the thin flange toward a front of the engine assembly.

3. A method as set forth in claim 2 wherein the step of positioning the lower thrust bearing is further defined as positioning the lower thrust bearing with the thick flange toward the front of the engine assembly and the thin flange toward the rear of the engine assembly.

4. A method as set forth in claim 3 further including the step of applying a force to the shaft toward the rear of the engine assembly to seat the thick flange of the lower thrust bearing against the lower support surface.

5. A method as set forth in claim 4 further including the step of applying a force to the shaft toward the front of the engine assembly to seat the thick flange of the upper thrust bearing against the upper support surface.

6. A method of aligning a thrust bearing assembly in an engine assembly of a vehicle, the engine assembly including at least an upper support surface, a shaft received within the upper support surface, and a lower support surface, said method comprising:
    providing the thrust bearing assembly to rotatably support the shaft in the upper support surface, the thrust bearing assembly having an upper thrust bearing and a lower thrust bearing;
    providing the upper thrust bearing and the lower thrust bearing with a concave inner surface and a convex outer surface extending arcuately between opposite ends and extending axially between opposite edges, each of the upper and the lower thrust bearings having load bearing flange extending radially from the outer surface;
    positioning the upper thrust bearing adjacent the upper support surface;
    positioning the shaft adjacent the upper thrust bearing;
    positioning the lower thrust bearing adjacent the lower support surface;
    securing the lower support surface to the upper support surface to position the lower thrust bearing in mating contact with the upper thrust bearing; and
    isolating each of the upper and lower thrust bearings from a force in opposite directions such that the load bearing flanges of each of the thrust bearings receive the force in only one direction to prevent the thrust bearing assembly from becoming unseated.

7. A method as set forth in claim 6 wherein the step of positioning the upper and the lower thrust bearings is further defined as positioning the load bearing flange of the upper thrust bearing axially spaced from the load bearing flange of the lower thrust bearing.

8. A method as set forth in claim 7 wherein the step of providing the upper and lower thrust bearing further includes the step of providing each of the upper and lower thrust bearing having a non-loading bearing flange extending radially outwardly from the bearing shell from an opposite edge of the load bearing flange.

9. A method as set forth in claim 8 wherein the step of providing the upper and lower thrust bearings having the non-load bearing flange is further defined as providing the load bearing flange having a thickness greater than that of the non-load bearing flange.

* * * * *